United States Patent
Cheng et al.

(10) Patent No.: US 9,751,579 B2
(45) Date of Patent: Sep. 5, 2017

(54) CHILD BICYCLE SEAT

(71) Applicants: Wei Cheng, Taipei (TW); Ching Hsing Lu, Changhua (TW)

(72) Inventors: Wei Cheng, Taipei (TW); Ching Hsing Lu, Changhua (TW)

(73) Assignee: Mega Productions Co., Ltd., New Taipei (TW)

( * ) Notice: Subject to any disclaimer, the term of this patent is extended or adjusted under 35 U.S.C. 154(b) by 0 days.

(21) Appl. No.: 15/487,446

(22) Filed: Apr. 14, 2017

(65) Prior Publication Data

US 2017/0217522 A1  Aug. 3, 2017

(30) Foreign Application Priority Data

May 4, 2016 (TW) .............................. 105206326 U

(51) Int. Cl.
*B62J 1/16* (2006.01)
*B62J 25/00* (2006.01)
*B62J 99/00* (2009.01)
*B62J 1/08* (2006.01)

(52) U.S. Cl.
CPC .............. *B62J 1/167* (2013.01); *B62J 1/08* (2013.01); *B62J 25/00* (2013.01); *B62J 99/00* (2013.01)

(58) Field of Classification Search
CPC ....... B62J 1/167; B62J 1/16; B62J 1/08; B62J 25/00
USPC ........ 280/202, 288.4, 291, 7.16; 297/195.13, 297/250.1, 256.16; 224/426
See application file for complete search history.

(56) References Cited

U.S. PATENT DOCUMENTS

| | | | | |
|---|---|---|---|---|
| 3,743,321 A | * | 7/1973 | Luschen | B62J 1/167 280/202 |
| 6,264,223 B1 | * | 7/2001 | Loewke | B62J 1/16 224/426 |
| 6,406,046 B1 | * | 6/2002 | Harrell | B62J 1/14 224/415 |
| 7,174,852 B2 | * | 2/2007 | Jefferson | B62J 1/167 119/496 |
| 7,523,986 B2 | * | 4/2009 | Jefferson | B62J 1/16 297/195.13 |
| 2012/0007395 A1 | * | 1/2012 | Colton | B62J 1/167 297/195.13 |

FOREIGN PATENT DOCUMENTS

DE 202011000589 * 5/2012 ............... B62K 1/16
GB 627393 * 8/1949

* cited by examiner

*Primary Examiner* — Anne Marie Boehler

(57) ABSTRACT

A child bicycle seat releasably mounted to a bicycle includes a seat assembly including a child seat secured to a tube member, a front tube mounted to a front end of the tube member and having top and bottom cavities, and a quick release clamp mounted to a rear end of the tube member; a handlebar assembly including a hollow pole having two opposite lower slots, a handlebar member threadedly secured to a top of the hollow pole, and a first quick release skewer secured to both the top cavity and the lower slots to fasten the front tube and the hollow pole together; a clamp assembly including a top tube having two opposite slot members, a second quick release skewer secured to both the bottom cavity and the slot members to fasten the front tube and the top tube together. The clamp assembly has a height adjustment mechanism.

10 Claims, 5 Drawing Sheets

CHILD BICYCLE SEAT

BACKGROUND OF THE INVENTION

1. Field of the Invention

The invention relates to child bicycle seats and more particularly to a child bicycle seat releasably mounted to the frame of a bicycle.

2. Description of Related Art

A conventional child bicycle seat for mounting to the frame of a bicycle comprises a clamp assembly defining an upper clamp section and a lower clamp section, each configured to secure to a top tube of a bicycle frame; an attachable seat connected to the clamp assembly, positioned to extend up from the top tube of the bicycle frame; a bracket assembly defining two elongated bracket members, each having a foot peg extending therefrom, wherein the bracket assembly is connected to the clamp assembly; and the upper clamp section and lower clamp section each including a bracket attachment screw. Each bracket member is connected to the bracket attachment screw on both the upper and lower clamp sections.

While the child bicycle seat enjoys its success in the market, continuing improvements in the exploitation of child bicycle seat of this type are constantly being sought.

SUMMARY OF THE INVENTION

It is therefore one object of the invention to provide a child bicycle seat releasably mounted to the frame of a bicycle, comprising a seat assembly including a tube member, a child seat secured to the tube member, a front tube mounted to a front end of the tube member and having a top cavity and a bottom cavity, and a quick release clamp mounted to a rear end of the tube member; a handlebar assembly including a hollow pole having two opposite lower slots, a handlebar member threadedly secured to a top of the hollow pole, and a first quick release skewer secured to both the top cavity and the lower slots to fasten the front tube and the hollow pole together; a clamp assembly including a top tube having two opposite slot members, a second quick release skewer secured to both the bottom cavity and the slot members to fasten the front tube and the top tube together, two support tubes, each secured to a bottom of the top tube and having a plurality of apertures disposed vertically, and two foot rest members each having a horizontal foot rest, a pole member formed with the foot rest, and a spring biased detent on the pole member wherein the spring biased detent is configured to project out of one of the apertures when the support tube is put on the pole member; and a locking rod disposed in a front portion of the tube member and having a front end releasably secured to the front tube.

The above and other objects, features and advantages of the invention will become apparent from the following detailed description taken with the accompanying drawings.

DETAILED DESCRIPTION OF THE INVENTION

Figure 1:
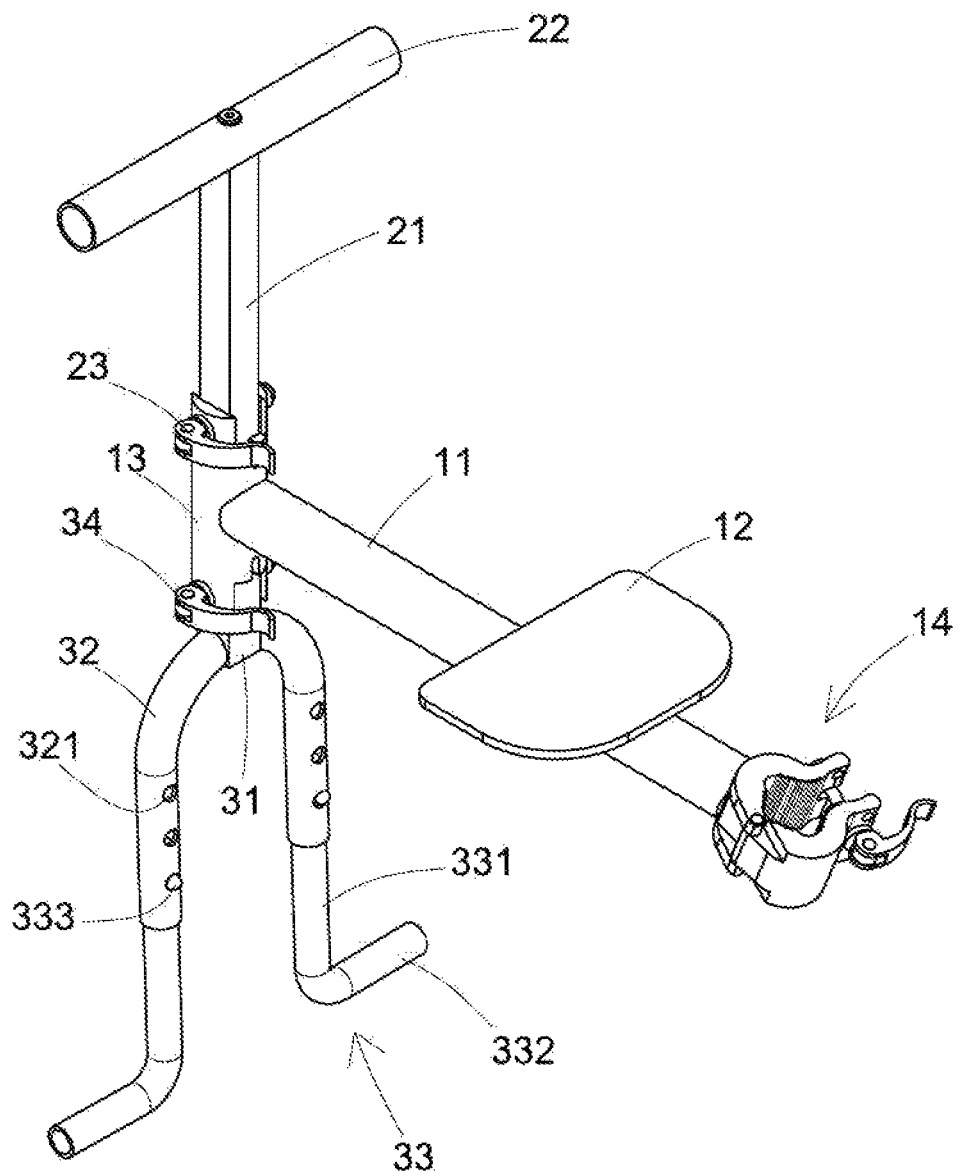
FIG. 1 is a perspective view of a child bicycle seat according to a first preferred embodiment of the invention.
Figure 2:
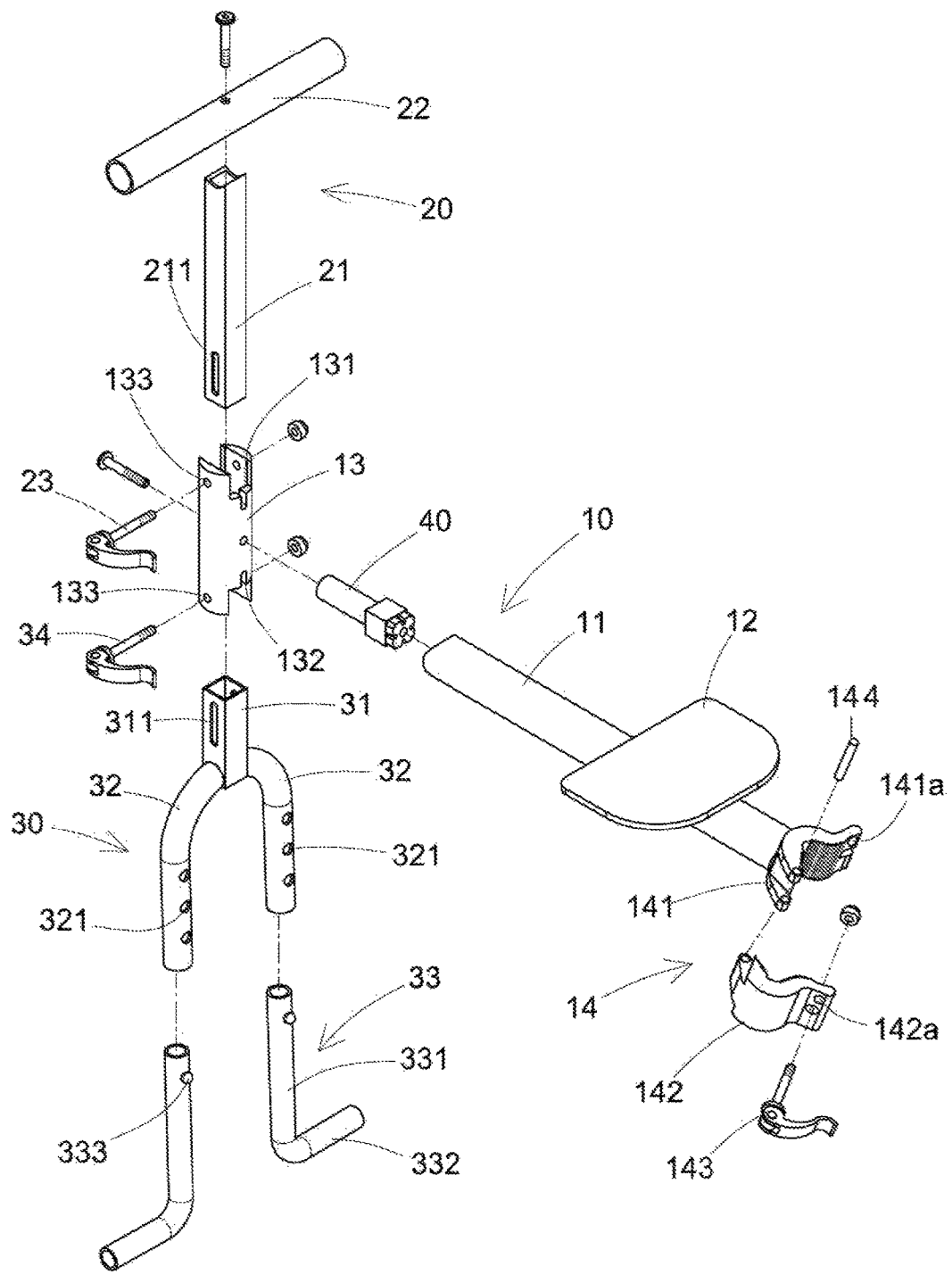
FIG. 2 is an exploded view of the child bicycle seat.

Referring to FIGS. 1 to 4, a child bicycle seat in accordance with a first preferred embodiment of the invention comprises the following components as discussed in detail below.

A seat assembly 10 includes a tube member 11, a child seat 12 secured to the tube member 11, a front tube 13 mounted to a front end of the tube member 11, and a quick release clamp 14 mounted to a rear end of the tube member 11 and including a first shell 141 secured to the rear end of the tube member 11 and having holes 141a, a second shell 142 having holes 142a and pivotably secured to the first shell 141 by a pin 144, and a quick release skewer 143 having its rod through the holes 142a, 141a to fasten the tube member 11 and a seat post 51 together. The front tube 13 includes a top cavity 131, a bottom cavity 132, and two sets of two holes 133 each communicating with the top cavity 131 or the bottom cavity 132.

A handlebar assembly 20 includes a hollow pole 21 having two opposite lower slots 211, a handlebar member 22 threadedly secured to the top of the pole 21, and a first quick release skewer 23 having its rod through one set of holes 133, the lower slots 211 and the top cavity 131 to fasten the front tube 13 and the pole 21 (i.e., the handlebar assembly 20) together.

A clamp assembly 30 includes a top tube member 31 having two opposite slots 311, a second quick release skewer 34 having its rod through the other set of holes 133, the slots 311 and the bottom cavity 132 to fasten the front tube 13 and the top tube member 31 (i.e., the clamp assembly 30) together, two support tubes 32 secured to a bottom of the top tube member 31, each support tube 32 having a plurality of apertures 321 disposed vertically, and two foot rest members 33 each having a horizontal foot rest 332, a pole 331 formed with the foot rest 332, and a spring biased steel ball 333. The pole 331 has an upper portion disposed in the support tube 32 to have the steel ball 333 projecting out of one of the apertures 321 so as to adjust a total height of the clamp assembly 30. The inverted U shaped clamp assembly 30 is astride a top tube 52 of the bicycle 50. A locking rod 40 is disposed in a front portion of the tube member 11 and has a front end threadedly secured to the front tube 13.

Figure 3:
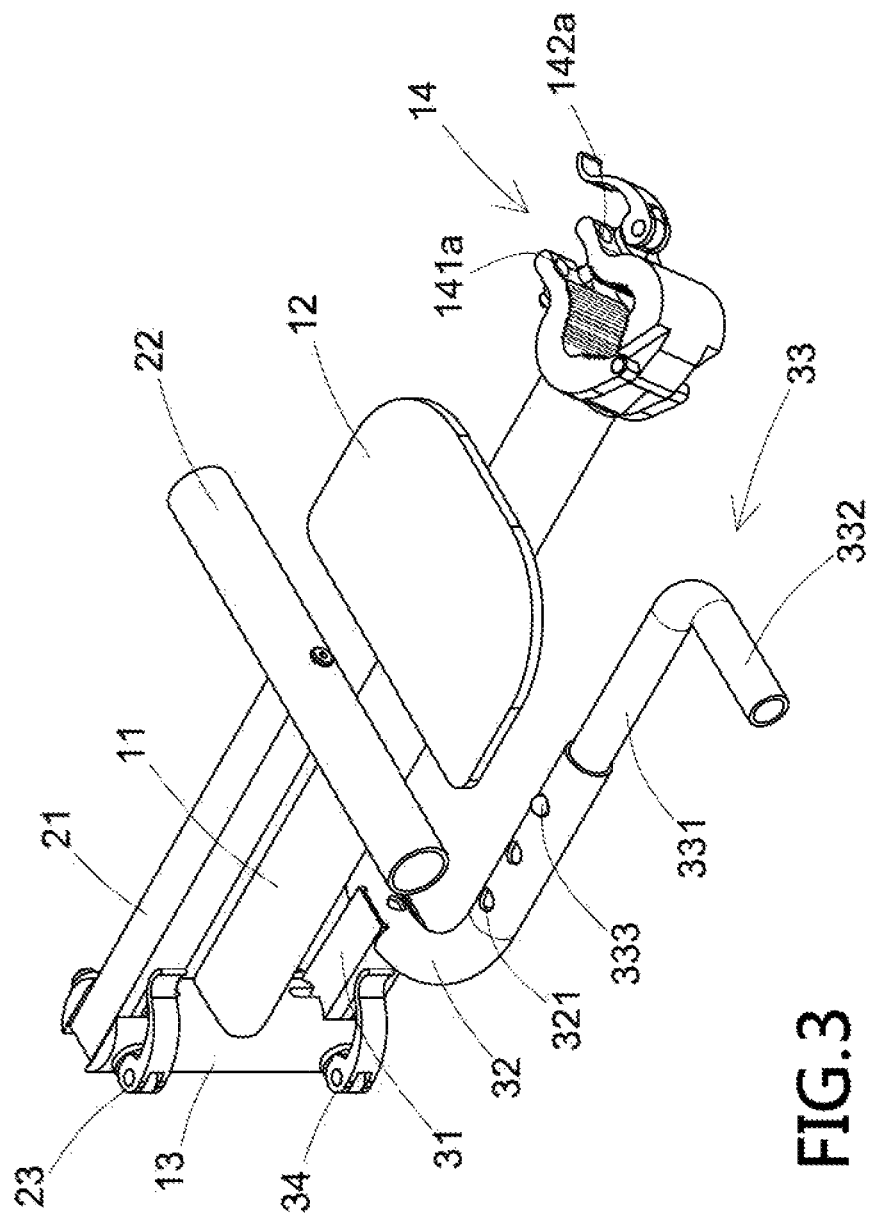
FIG. 3 is a perspective view of the child bicycle seat in a folded state.
Figure 4:
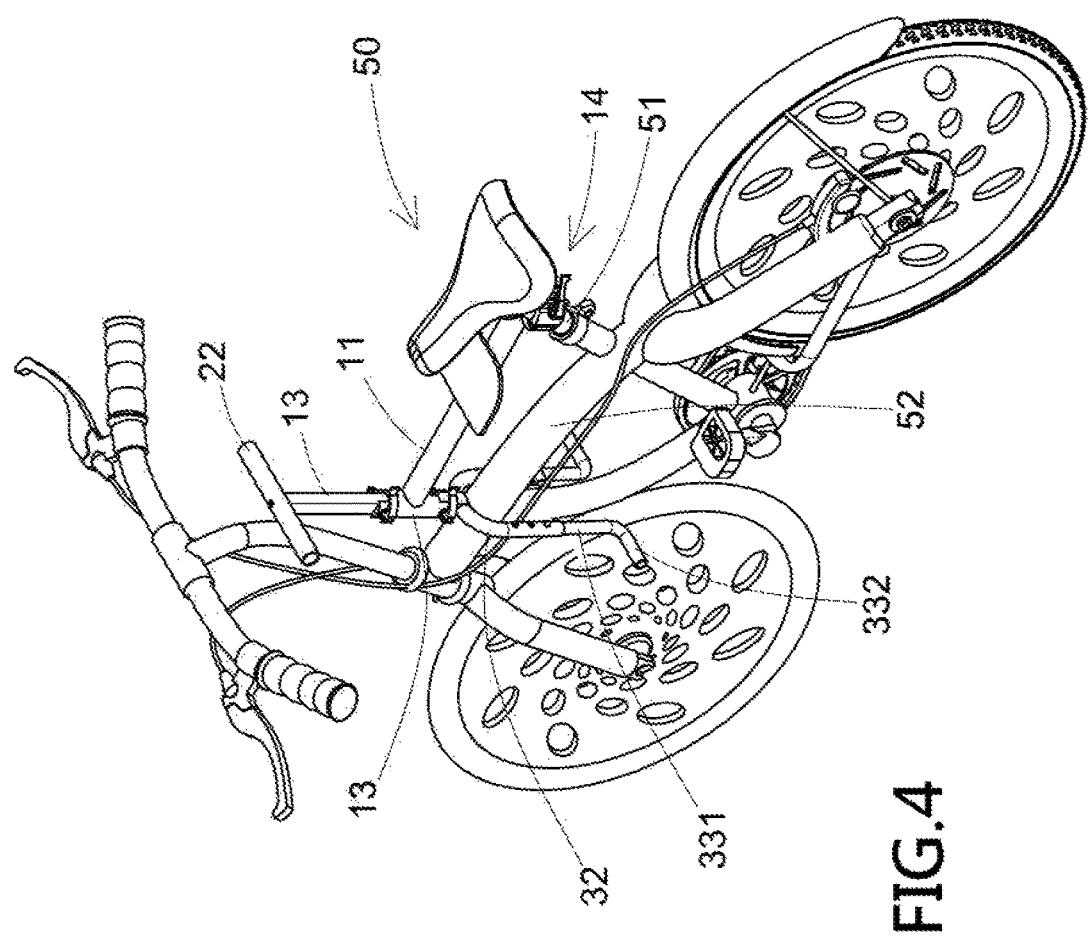
FIG. 4 is a perspective view of a bicycle having the child bicycle seat mounted to its frame.

As shown in FIGS. 1 and 3, for storing the child bicycle seat, a rider may unfasten both the first and second quick release skewers 23 and 34, rotate the handlebar assembly 20 about 90-degree toward the seat assembly 10 to dispose above the seat assembly 10, rotate the clamp assembly 30 about 90-degree toward the seat assembly 10 to dispose under the seat assembly 10, and fasten both the first and second quick release skewers 23 and 34. As a result, the child bicycle seat is folded for saving space in a storage state.

Figure 5:
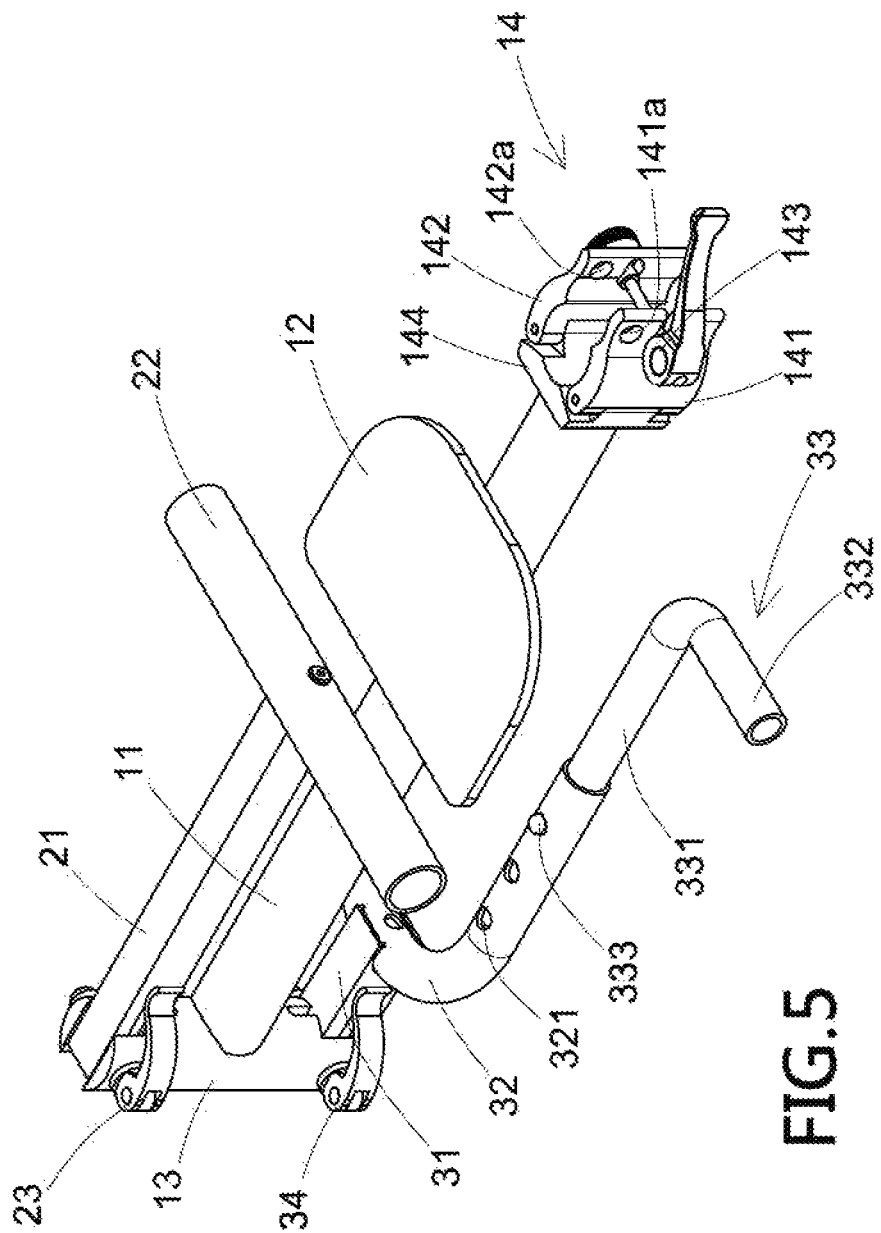
FIG. 5 is a perspective view of a child bicycle seat according to a second preferred embodiment of the invention, the child bicycle seat being folded.

Referring to FIG. 5, a child bicycle seat in accordance with a second preferred embodiment of the invention is shown. The characteristics of the second preferred embodiment are substantially the same as that of the first preferred embodiment except the following: The quick release clamp 14 includes a plate 144 secured to the rear end of the tube member 11, a first shell 141 pivotably secured to one side of the plate 144 and having holes 141a, a second shell 142 pivotably secured to the other side of the plate 144 and having holes 142a, and a quick release skewer 143 having its rod through the holes 142a and 141a to fasten the tube member 11 and a seat post 51 together.

While the invention has been described in terms of preferred embodiments, those skilled in the art will recognize that the invention can be practiced with modifications within the spirit and scope of the appended claims.

What is claimed is:

1. A child bicycle seat releasably mounted to the frame of a bicycle, comprising:
   a seat assembly including a tube member, a child seat secured to the tube member, a front tube mounted to a front end of the tube member and having a top cavity and a bottom cavity, and a quick release clamp mounted to a rear end of the tube member;
   a handlebar assembly including a hollow pole having two opposite lower slots, a handlebar member threadedly secured to a top of the hollow pole, and a first quick release skewer secured to both the top cavity and the lower slots to fasten the front tube and the hollow pole together; and
   a clamp assembly including a top tube member having two opposite slot members, a second quick release skewer secured to both the bottom cavity and the slot members to fasten the front tube and the top tube member together, two support tubes, each secured to a bottom of the top tube member and having a plurality of apertures disposed vertically, and two foot rest members each having a horizontal foot rest, a pole member formed with the foot rest, and a spring biased detent disposed on the pole member wherein the spring biased detent is configured to project out of one of the apertures when the support tube is put on the pole member.

2. The child bicycle seat of claim 1, further comprising a locking rod disposed in a front portion of the tube member, the locking rod having a front end releasably secured to the front tube.

3. The child bicycle seat of claim 1, wherein the quick release clamp comprises a first shell secured to the rear end of the tube member and having a plurality of first holes, a second shell having a plurality of second holes and pivotably secured to the first shell, and a quick release skewer having a rod through the first and second holes to fasten the tube member and a seat post of the bicycle together.

4. The child bicycle seat of claim 1, wherein the quick release clamp comprises a plate secured to the rear end of the tube member, a first shell pivotably secured to one side of the plate and having a plurality of first holes, a second shell pivotably secured to the other side of the plate and having a plurality of second holes, and a quick release skewer having a rod through the first and second holes to fasten the tube member and a seat post of the bicycle together.

5. The child bicycle seat of claim 1, wherein the horizontal foot rest is adapted to allow the foot of a driver to rest thereon.

6. The child bicycle seat of claim 1, wherein the spring biased detent is a spring biased steel ball.

7. The child bicycle seat of claim 1, wherein the hollow pole has a rectangular cross section.

8. The child bicycle seat of claim 1, wherein the top tube member has a rectangular cross section.

9. The child bicycle seat of claim 1, wherein the support tubes are configured to clamp a top tube of the bicycle.

10. The child bicycle seat of claim 1, wherein each of the hollow pole and the top tube member has a square cross section.

* * * * *